US006985587B2

(12) United States Patent
Adams

(10) Patent No.: US 6,985,587 B2
(45) Date of Patent: Jan. 10, 2006

(54) METHOD AND SYSTEM FOR CALLING LINE AUTHENTICATED KEY DISTRIBUTION

(75) Inventor: Thomas Lee Adams, Austin, TX (US)

(73) Assignee: SBC Technology Resources, Inc., Austin, TX (US)

(*) Notice: Subject to any disclaimer, the term of this patent is extended or adjusted under 35 U.S.C. 154(b) by 708 days.

(21) Appl. No.: 10/038,048

(22) Filed: Dec. 20, 2001

(65) Prior Publication Data

US 2002/0159597 A1 Oct. 31, 2002

Related U.S. Application Data

(63) Continuation-in-part of application No. 09/747,741, filed on Dec. 22, 2000.

(51) Int. Cl.
*H04K 1/00* (2006.01)

(52) U.S. Cl. ....................................... 380/257; 380/229

(58) Field of Classification Search ................ 380/257, 380/229

See application file for complete search history.

(56) References Cited

U.S. PATENT DOCUMENTS

| | | | |
|---|---|---|---|
| 5,003,595 A | | 3/1991 | Collins et al. |
| 5,239,294 A | | 8/1993 | Flanders et al. |
| 5,325,419 A | | 6/1994 | Connolly et al. |
| 5,546,447 A | | 8/1996 | Skarbo et al. |
| 5,572,193 A | | 11/1996 | Flanders et al. |
| 5,684,951 A | | 11/1997 | Goldman et al. |
| 5,724,426 A | | 3/1998 | Rosenow et al. |
| 5,901,284 A | * | 5/1999 | Hamdy-Swink ............ 713/200 |
| 5,940,187 A | | 8/1999 | Berke |
| 6,021,190 A | * | 2/2000 | Fuller et al. ........... 379/212.01 |
| 6,035,402 A | | 3/2000 | Vaeth et al. |
| 6,067,546 A | | 5/2000 | Lund |
| 6,088,799 A | | 7/2000 | Morgan et al. |
| 6,098,056 A | | 8/2000 | Rusnak et al. |

OTHER PUBLICATIONS

"Method and System for Calling Line Authentication," U.S. Appl. No. 09/747,741, filed 12/22/00, Inventor: Thomas Adams.

* cited by examiner

*Primary Examiner*—Justin T. Darrow
*Assistant Examiner*—Venkat Perungavoor
(74) *Attorney, Agent, or Firm*—Brinks Hofer Gilson & Lione

(57) ABSTRACT

The preferred embodiments described herein provide a method and system for calling line authenticated key distribution. In one preferred embodiment, an authentication key is provided to a calling party if the calling party is phoning from a calling line associated with an authorized user. This preferred embodiment provides a more secure authentication key distribution method as compared to the prior art since preventing an unauthorized user from gaining access to an authorized user's calling line is more feasible and reliable than attempting to prevent an unauthorized user from obtaining an authorized user's password. Other preferred embodiments are provided, and each of the preferred embodiments described herein can be used alone or in combination with one another.

32 Claims, 3 Drawing Sheets

METHOD AND SYSTEM FOR CALLING LINE AUTHENTICATED KEY DISTRIBUTION

RELATED APPLICATIONS

This is a continuation-in-part of application Ser. No. 09/747,741, filed Dec. 22, 2000, which is hereby incorporated by reference.

TECHNICAL FIELD

The present invention relates to telecommunication systems and in particular to a method and system for calling line authenticated key distribution.

BACKGROUND

Servers on computer networks, such as the Internet, can provide secure services to users. Users are often required to provide an authenticated key to gain access to such secured services. Several methods can be used to distribute authenticated keys to authorized users. For example, an authenticated key can be printed on paper and mailed to an authorized user's home. In some situations, it may be desired to distribute authenticated keys electronically, such as with a server on the computer network. However, distributing authenticated keys this way can be problematic since it can be difficult to verify that the person requesting an authenticated key is an authorized user. For example, if a password is used to verify the identity of a person requesting an authenticated key, the server providing the key cannot differentiate between an authorized user and an imposter who stole the authorized user's password. Moreover, the problems of password distribution and key distribution are similar: passwords that provide high security (e.g., an arbitrary 128-character string) are too difficult to distribute by voice, and passwords that are easy to distribute by voice provide little security.

There is a need, therefore, for a method and system that can be used to distribute authenticated keys that overcomes the disadvantages described above.

DETAILED DESCRIPTION OF THE PRESENTLY PREFERRED EMBODIMENTS

The various embodiments of the present invention yield several advantages over the prior art. By way of introduction, a telephone network is used in combination with a computer network to distribute authentication keys to take advantage of the telephone network's ability to identify a calling party. In one preferred embodiment, an authentication key is provided to a calling party if the calling party is phoning from a calling line associated with an authorized user. This preferred embodiment provides a more secure authentication key distribution method as compared to the prior art since preventing an unauthorized user from gaining access to an authorized user's calling line is more feasible and reliable than attempting to prevent an unauthorized user from obtaining an authorized user's password. Other preferred embodiments are provided, and each of the preferred embodiments described below can be used alone or in combination with one another.

Figure 1:
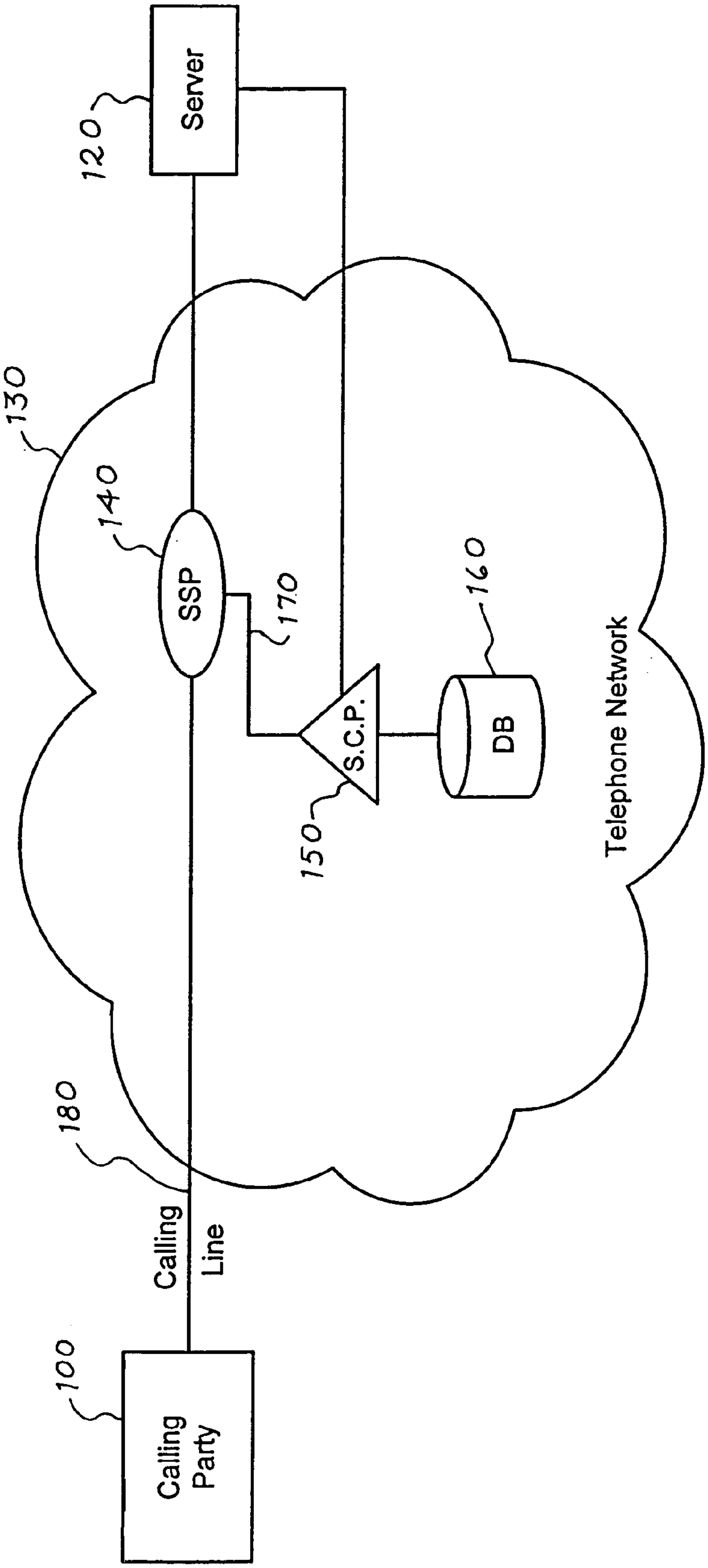
FIG. 1 is an illustration of a system of a preferred embodiment for calling line authenticated key distribution.

Turning now to the drawings, FIG. 1 is an illustration of a system of a preferred embodiment for calling line authenticated key distribution. As shown in FIG. 1, this system comprises a calling party 100, a server 120, and a telephone network 130 connecting the calling party 100 and the server 120. As used herein, the term "connecting" means directly connecting or indirectly connecting through one or more named or unnamed components. The telephone network 130 enables the calling party 100 to establish a communication link with the server 120. The calling party 100 can use any suitable type of customer premises equipment that can communicate with the server 120. For example, the customer premises equipment can take the form of a personal computer, workstation, mobile telephone, and suitable types of portable electronic devices. The server 120 can also take any suitable form, such as an Internet server.

The calling party 100 connects to the telephone network 130 via a calling line 180. The calling line 180 is identified by a calling line identifier. The calling line identifier can take any suitable form and, in one embodiment, is a directory number (e.g., the calling party's telephone number). In this preferred embodiment, the telephone network 130 is part of a public-switched telephone network and is implemented as an advanced intelligent network ("AIN"), such as the Signal System 7 ("SS7") network. The telephone network 130 comprises a service switching point ("SSP") 140, a service control point ("SCP") 150, and a database 160. In this embodiment, the SSP 140 and SCP 150 are connected to one another by a Common Channel Signaling network 170. It should be noted that the telephone network 130 can comprise additional components (such as a signal transfer point and additional SSPs), which are not shown in FIG. 1 for simplicity.

In this preferred embodiment, the server 120 is used to distribute authenticated keys, which are used to authenticate a user for a secured service offered by the server 120 or by another server on the same or different computer network. As used herein, the term "authenticated key" broadly refers to any mechanism that can be used to authenticate a user. An authentication key can be in a form (such as an alphanumeric string) that allows a user to manually input the key when attempting authentication. An authentication key can take other forms, such as, but not limited to, a cookie for a web browser. A key can also be of such complexity that it is infeasible to transmit other than by automated means.

Figure 2:
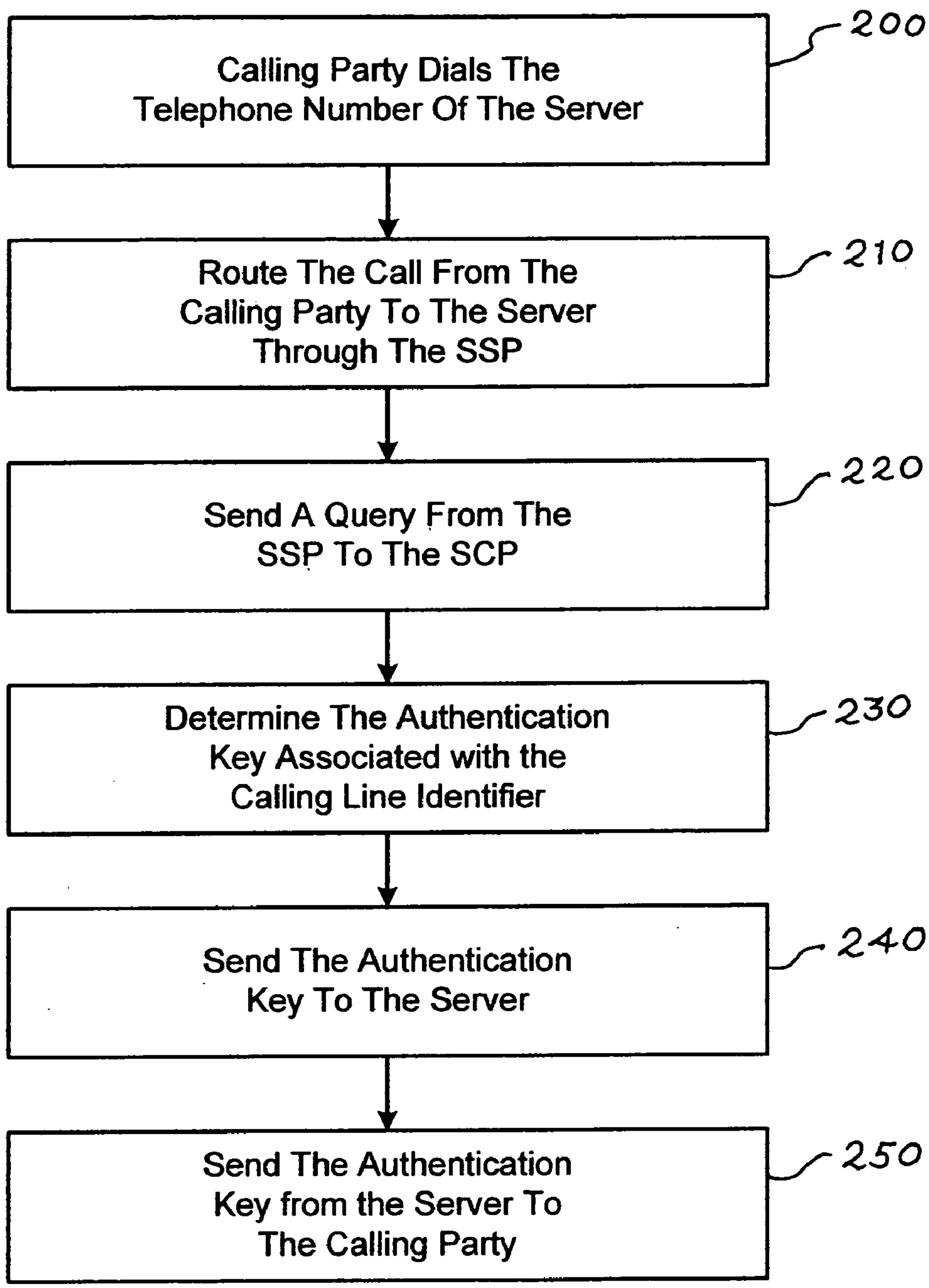
FIG. 2 is a flow chart of a method of a preferred embodiment for calling line authenticated key distribution.

The operation of this preferred embodiment will now be illustrated in conjunction with FIG. 2, which is a flow chart of a method of a preferred embodiment for calling line authenticated key distribution. When the calling party 100 wants to receive an authentication key from the server 120, the calling party 100 dials the telephone number of the server 120 (act 200). In one preferred embodiment, the telephone number of the server 120 is an 800 number. The telephone network 130 routes the call from the calling party 100 to the server 120 through the SSP 140 (act 210). The SSP 140 also sends a query to the SCP 150 (act 220). The query includes the calling line identifier of the calling line 180 used by the calling party 100 to place the call to the server 120. In this preferred embodiment, the calling line identifier is the directory number of the calling line 180. The database 160 stores data associating authentication keys with respective calling line identifiers, and, in response to the query sent by the SSP 140, the SCP 150 consults that database 160 to determine if there is an authentication key associated with the calling line identifier (act 230). If there is, the SCP 150 retrieves the authentication key and sends it to the server 120 (act 240). As used herein, the phrase "sends to" can mean directly sends to or indirectly sends to through one or more named or unnamed components. For example, the SCP 150 can send the authentication key to the server 120 through a firewall and/or through additional servers, as will be discussed below. The server 120 then sends the authentication key to the calling party 100 via the telephone network 130 (act 250). The server 120 can send the authentication key to the calling party 100 on its own initiative or in response to a request from the calling party 100. Further, the server 120 can send the authentication key during the connection with the calling party 100 or at some later time (e.g. via email). It should be noted that some or all of acts 220, 230 and 240 can be performed before, during, or after act 210. Accordingly, the authentication key can be sent to the server 120 simultaneously with the calling party being connected to the server 120, or the authentication key can be sent to the server 120 before or after the calling party is connected to the server 120.

Figure 3:
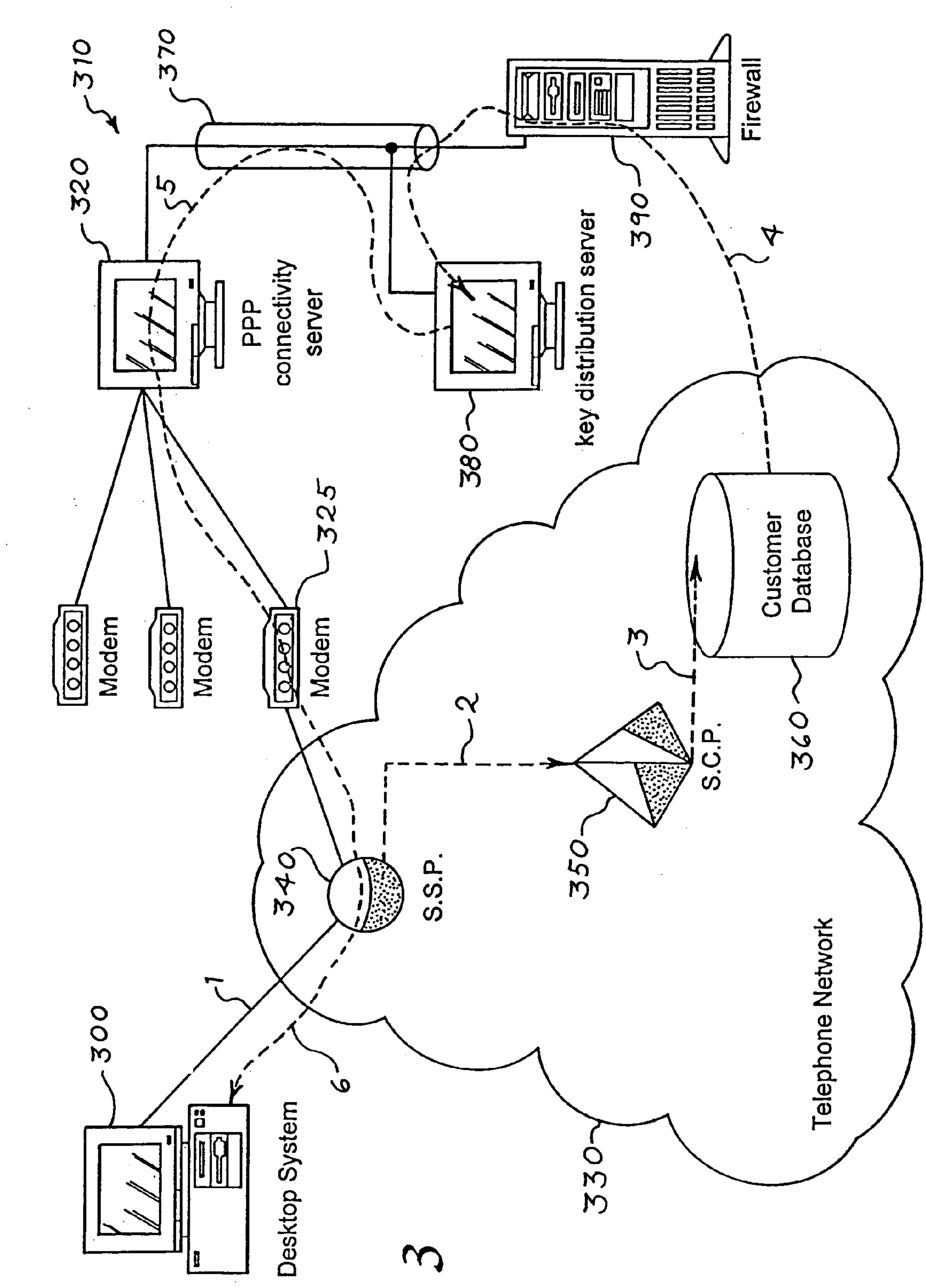
FIG. 3 is an illustration of a system of another preferred embodiment for calling line authenticated key distribution.

Turning again to the drawings, FIG. 3 is an illustration of a system of another preferred embodiment that leverages AIN and Internet technologies to distribute authentication keys based on calling line identifiers. As shown in FIG. 3, this system comprises a calling party with a desktop personal computer system 300, a computer network 310, and a telephone network 330 connecting the calling party 300 and the computer network 310. The telephone network 330 is part of a public-switched telephone network and comprises an SSP 340, an SCP 350, and a customer database 360, which correlates authentication keys and calling line identifiers. The computer network 310 operates in an Internet environment and comprises a point-to-point protocol (PPP) connectivity server 320, an isolated Ethernet or local area network (LAN) 370, a key distribution server 380, and a firewall 390. The computer network 310 connects with the telephone network 330 through the PPP connectivity server 320 (via a modem 325) and through the firewall 390.

The operation of the system will now be illustrated in conjunction with the annotations in FIG. 3. First, the calling party 300 or software supplied by a key distribution vendor calls a special 800 toll-free key distribution number assigned to a dial-up server (action 1). A terminating attempt trigger ("TAT") on the 800 number identifies the calling line identifier (e.g., the directory number) of the calling line used to initiate the call and causes the SSP 340 to query the SCP 350 with the calling line identifier (action 2). In response to the query, the SCP 340 searches the database 360 for the calling line identifier presented in the query (action 3). Upon detection of the calling line identifier, the SCP 350 retrieves the authentication key associated with the calling line identifier. The SCP 350 then directs the SSP 340 to route the call from the calling party 300 to the modem 325, thereby establishing a communication link between the calling party 300 and the modem 325. When the call is answered, a dial-up connection to the PPP connectivity server 320 is made, and a TCP/IP link is established.

Next, the authentication key is sent through the firewall 390 and is placed on the key distribution server 380 (action 4). The key distribution server 380 then provides the authentication key to the PPP connectivity server 320 through the isolated LAN 370 (action 5). In one embodiment, the PPP connectivity server 320 queries the key distribution server 380 for the authentication key upon an establishment of the communication link between the calling party 300 and the PPP connectivity server 320. In another embodiment, the key distribution server 380 provides the authentication key to the PPP connectivity server 320 upon detection of the establishment of the communication link between calling party 300 and the PPP connectivity server 320. Finally, the PPP connectivity server 320 sends the authentication key to the calling party 300 (action 6), and the SCP 350 removes the authentication key from the key distribution server 380 or marks the authentication key as distributed.

With the authentication key, the calling party 300 can access a secured service offered by the same or different server on the Internet. For example, the calling party 300 can phone a different dial-up server to access a secured service, such as a service that provides the calling party 300 with the ability to turn on/off telecommunication features offered to that calling party 300. In this example, the calling party 300 connects to the connectivity server 320 only once (to receive the authentication key), and then uses the authentication key in a later interaction with a different server.

There are several alternatives that can be used with these preferred embodiments. In the preferred embodiment discussed above, the SCP retrieved an authentication key from a database and sent the key to the key distribution server. In an alternate embodiment, the database merely stores a list of calling line identifiers for which authentication keys exist. In this embodiment, the key distribution server—not the database consulted by the SCP—stores authentication keys. In operation, in response to a query from the SSP, the SCP consults the database to determine whether the calling line identifier is listed as one of the calling line identifiers for which an authentication key exists. If the calling line identifier is listed, the SCP sends an indication to the key distribution server that the authentication key stored in the key distribution server should be sent to the calling party. After the authentication key is sent to the calling party, the authentication key can be removed from the key distribution server or the authentication key can merely be marked as distributed.

It should also be noted that originating or terminating SSPs can be used to send a query to an SCP. Additionally, while the telephone networks were described above as AIN networks, other types of networks can be used. More generally, any suitable type of telecommunication element (e.g., switches, processors) can be used to implement the methods described above. Further, computer-readable media having computer-readable code embodied therein for implementing these methods can be used.

Finally, in the embodiments described above, a telephone network determines an authentication key associated with a calling line identifier and sends the authentication key to a server. In an alternate embodiment, a component other than the telephone network (e.g., a server or other component in a computer network) can store data correlating calling line identifiers and authentication keys, and the same or a different component in the computer network can use this data to determine an authentication key associated with a given calling line identifier. For example, a calling line identifier such as a directory number can be provided to the called party when the called party uses an 800 number or when the called party subscribes to a Caller ID service in an AIN or non-AIN network. The called party can use the directory number to authenticate the caller so that an authentication key is sent only if the directory number is recognized.

It is intended that the foregoing detailed description be understood as an illustration of selected forms that the invention can take and not as a definition of the invention.

It is only the following claims, including all equivalents, that are intended to define the scope of this invention.

What is claimed is:

1. A method for sending an authentication key to a calling party, the method comprising:

routing a call with a telephone network from a calling party to a server, the calling party initiating the call from a calling line identified by a calling line identifier;

determining with the telephone network an authentication key associated with the calling line identifier;

sending the authentication key to the server; and sending the authentication key from the server to the calling party.

2. The method of claim 1, wherein the call is routed using a service switching point.

3. The method of claim 1, wherein a service control point determines the authentication key associated with the calling line identifier.

4. The method of claim 1, wherein the server comprises a connectivity server, and wherein the authentication key is sent to the connectivity server through a key distribution server.

5. The method of claim 4, wherein the authentication key is sent to the key distribution server through a firewall.

6. The method of claim 1, wherein the calling line identifier comprises a directory number.

7. A method for sending an authentication key to a calling party, the method comprising:

routing a call from a calling party to a connectivity server through a service switching point, the calling party initiating the call from a calling line identified by a calling line identifier;

sending a query from the service switching point to a service control point, the query comprising the calling line identifier; with the service control point, determining an authentication key associated with the calling line identifier;

sending the authentication key to a key distribution server;

sending the authentication key from the key distribution server to the connectivity server; and sending the authentication key from the connectivity server to the calling party.

8. The method of claim 7 further comprising:

removing the authentication key from key distribution server.

9. The method of claim 7, wherein the authentication key is sent to the key distribution server through a firewall.

10. The method of claim 7, wherein the connectivity server is in communication with the service switching point via a modem.

11. The method of claim 7, wherein the service control point retrieves the authentication key from a database correlating authentication keys and calling line identifiers.

12. The method claim 7, wherein the calling line identifier comprises a directory number.

13. The method of claim 7, wherein the query is sent from the service switching point to the service control point in response to a terminating attempt trigger.

14. A system for sending an authentication key to a calling party, the system comprising:

a server;

a service switching point operative to route a call from a calling party to the server, the calling party initiating the call from a calling line identified by a calling line identifier;

a database correlating authentication keys and calling line identifiers; and a service control point in communication with the database and operative to determine an authentication key associated with the calling line identifier in response to a query from the service switching point, wherein the service control point is further operative to send the authentication key associated with the calling line identifier to the server;

wherein the server is further operative to send the authentication key to the calling party.

15. The system of claim 14, wherein the server is part of a computer network comprising a second server, and wherein the authentication key is sent to the first-mentioned server via the second server.

16. The system of claim 15, wherein the first-mentioned server comprises a connectivity server, and wherein the second server comprises a key distribution server.

17. The system of claim 14 further comprising a firewall, wherein the authentication key is sent to the server through the firewall.

18. The system of claim 14, wherein the calling line identifier comprises a directory number.

19. The system of claim 14, wherein the service switching point is operative to send the query to the service control point in response to a terminating attempt trigger.

20. The system of claim 14 further comprising a modem connecting the server with the service switching point.

21. The method of claim 7 further comprising:

marking the authentication key as distributed.

22. A method for sending an authentication key to a calling party, the method comprising:

routing a call from a calling party to a connectivity server through a service switching point, the calling party initiating the call from a calling line identified by a calling line identifier;

sending a query from the service switching point to a service control point, the query comprising the calling line identifier;

determining with the service control point whether an authentication key for the calling line identifier exists in a key distribution server;

if the authentication key for the calling line identifier exists, sending an indication to the key distribution server that the authentication key stored in the key distribution server should be sent to the calling party;

sending the authentication key from the key distribution server to the connectivity server; and sending the authentication key from the connectivity server to the calling party.

23. The method of claim 22 further comprising:

removing the authentication key from key distribution server.

24. The method of claim 22 further comprising:

marking the authentication key as distributed.

25. The method of claim 22, wherein the indication is sent to the key distribution server through a firewall.

26. The method of claim 22, wherein the connectivity server is in communication with the service switching point via a modem.

27. The method of claim 22, wherein the service control point determines whether an authentication key exists for the calling line identifier by consulting a database storing calling line identifiers for which authentication keys exist.

28. The method of claim 22, wherein the calling line identifier comprises a directory number.

29. The method of claim 22, wherein the query is sent from the service switching point to the service control point in response to a terminating attempt trigger.

30. A method for sending an authentication key to a calling party, the method comprising:

routing a call with a telephone network from a calling party to a server, the calling party initiating the call from a calling line identified by a calling line identifier;

providing, with the telephone network, the server with the calling line identifier;

authenticating, with the server, the calling party with the calling line identifier; and sending an authentication key from the server to the calling party.

31. The method of claim 30, wherein the calling line identifier comprises a directory number.

32. The method of claim 30, wherein the server comprises a connectivity server, and the invention further comprises: before the authentication key is sent from the connectivity server to the calling party, sending the authentication key to the connectivity server from a key distribution server.

* * * * *